United States Patent
Koehn et al.

(10) Patent No.: US 9,523,703 B2
(45) Date of Patent: Dec. 20, 2016

(54) VELOCITY PROFILE MAPPING SYSTEM

(75) Inventors: Jason Andrew Koehn, Enumclaw, WA (US); James K. Whitley, Gig Harbor, WA (US); Shawn Paul Snell, Monroe, WA (US)

(73) Assignee: THE BOEING COMPANY, Chicago, IL (US)

( * ) Notice: Subject to any disclaimer, the term of this patent is extended or adjusted under 35 U.S.C. 154(b) by 803 days.

(21) Appl. No.: 13/431,582

(22) Filed: Mar. 27, 2012

(65) Prior Publication Data

US 2013/0261992 A1    Oct. 3, 2013

(51) Int. Cl.
*G01P 5/00* (2006.01)

(52) U.S. Cl.
CPC ..................... *G01P 5/001* (2013.01)

(58) Field of Classification Search
CPC .. F05D 2270/3061; G01F 1/6965; G01F 1/74; G01F 1/002; G01F 1/46; G01P 5/001; G01N 21/532; G01M 15/14; F02C 7/00
See application file for complete search history.

(56) References Cited

U.S. PATENT DOCUMENTS

| | | |
|---|---|---|
| 4,144,768 A | 3/1979 | Andersson et al. |
| 4,199,936 A | 4/1980 | Cowan et al. |
| 4,426,845 A | 1/1984 | Brooks et al. |
| 4,745,740 A | 5/1988 | Dunn et al. |
| 4,834,619 A | 5/1989 | Walton |
| 5,097,662 A | 3/1992 | Vieth |
| 5,114,100 A | 5/1992 | Rudolph et al. |
| 5,606,622 A | 2/1997 | Christenson |
| 5,779,196 A | 7/1998 | Timar |
| 7,175,136 B2 | 2/2007 | Shah et al. |
| 8,016,650 B2 | 9/2011 | Horstman et al. |
| 8,061,477 B2 | 11/2011 | Patel et al. |
| 8,322,658 B2 | 12/2012 | Gershzohn et al. |
| 2003/0205094 A1* | 11/2003 | Plum ............................... 73/861 |
| 2005/0039520 A1* | 2/2005 | Davis et al. ................... 73/49.5 |
| 2007/0018010 A1* | 1/2007 | Mehus et al. ..................... 239/6 |
| 2009/0112368 A1* | 4/2009 | Mann, III ............... B64F 1/364 700/275 |
| 2009/0126502 A1* | 5/2009 | Wee et al. .................. 73/861.04 |
| 2010/0268486 A1* | 10/2010 | Takeda et al. ................. 702/48 |

(Continued)

FOREIGN PATENT DOCUMENTS

| | | |
|---|---|---|
| DE | 4422413 A1 | 1/1996 |
| EP | 1837661 A1 | 9/2007 |

(Continued)

OTHER PUBLICATIONS

Munson et al., Diffusion based analysis in a sheath flow microchannel—the sheath flow T-sensor, Royal Society of Chemistry, May 2005.*

(Continued)

*Primary Examiner* — Gregory J Toatley
*Assistant Examiner* — Kyle R Quigley
(74) *Attorney, Agent, or Firm* — Yee & Associates, P.C.

(57) ABSTRACT

A velocity mapping system comprising a sensor system and an airflow mapper. The sensor system is configured to generate data about a velocity of airflow for a location in a duct system. The airflow mapper is configured to receive the data from the sensor system and generate a profile of the velocity of the airflow at the location in the duct system.

15 Claims, 9 Drawing Sheets

(56) References Cited

U.S. PATENT DOCUMENTS

2010/0312498 A1* 12/2010 Hamann et al. ............... 702/45
2012/0279313 A1* 11/2012 Diatzikis et al. ............... 73/861

FOREIGN PATENT DOCUMENTS

EP         2645111  A1    10/2013
WO      WO0241003  A2     5/2002

OTHER PUBLICATIONS

European Search Report, dated Jul. 4, 2013, regarding Application No. EP13160544.6, 6 pages.
European Search Report, dated Sep. 25, 2014, regarding Application No. EP13160544.6, 5 pages.
European Search Report, dated May 5, 2015, regarding Application No. EP13160544.6, 5 pages.
Canadian Intellectual Property Office Examination Report, dated Dec. 9, 2014, regarding Application No. 2,801,381, 3 pages.
Canadian Office Action mailed Jan. 18, 2016, regarding application No. 2801381, 4 pages.

* cited by examiner

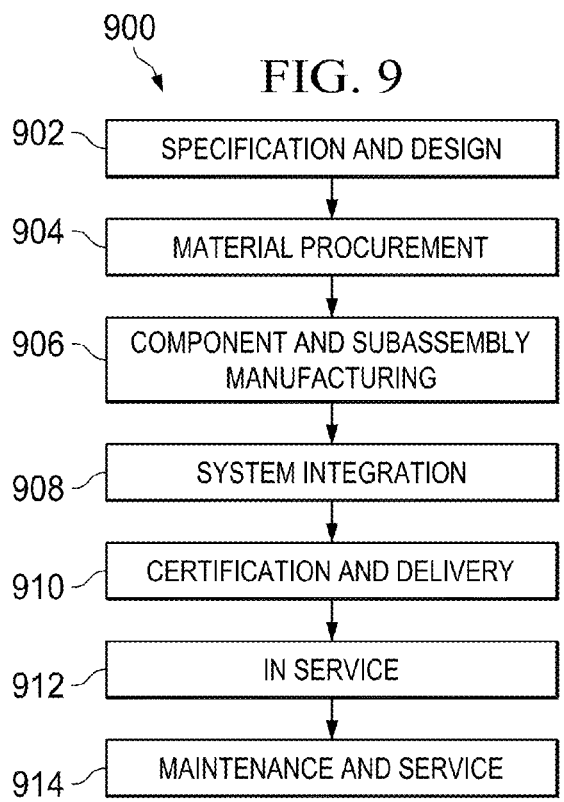
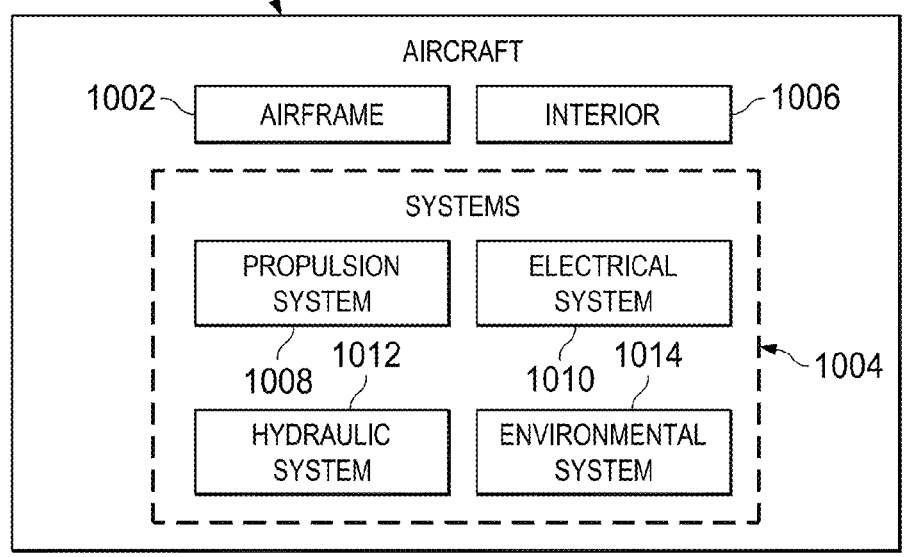

VELOCITY PROFILE MAPPING SYSTEM

BACKGROUND INFORMATION

1. Field

The present disclosure relates generally to airflow and, in particular, to measuring the velocity of the airflow. Still more particularly, the present disclosure relates to a method and apparatus for mapping the multiple velocities of airflow that may be found in a duct.

2. Background

A duct is an enclosed passage or channel for conveying a substance, such as a gas or liquid. Ducts are commonly used throughout an aircraft. For example, ducts are part of a duct system used in an air distribution system for an environmental control system in the aircraft.

An air distribution system in an aircraft may be used during the operation of components in an environmental control system. For example, the ducts in the air distribution system may be used to supply or remove air from different locations in the aircraft. The movement of air into or out of these locations may occur during the operation of systems, such as a cabin air conditioning and temperature control system (CACTCS), a cabin pressure control system (CPCS), an electrical and electronic cooling system (EECS), an integrated cooling system (ICS) for a cargo bay, a power electronics cooling system (PECS), and other suitable systems.

Each of these systems employs airflow management. For example, one or more of these systems may perform flow balancing, distribution of air throughout the cabin of the aircraft, flow regulation, and/or other functions in managing airflow. The movement of air to different locations during the operation of the systems occurs through a duct system in the aircraft.

Further, the flow of air through the duct system also may be used to cool equipment in the aircraft. Without proper cooling, equipment may be overheated and may not function as desired. If the equipment receives more airflow than needed, other areas, such as the passenger cabin, may not be cooled as much as desired.

In controlling airflow through a duct system, airflow sensors and airflow controllers may be placed in different locations in the ducts within a duct system. The airflow sensors and airflow controllers may be used to manage the airflow within the duct system.

However, duct systems may have complex configurations such that the airflow is not consistent throughout the duct systems. For example, a duct system may have multiple bends, different diameters, splits, and other features that may affect the airflow.

These different features may result in different velocities of airflow in different locations of the duct system or different velocities of airflow across a cross-section of the duct system. With these different features, eddy currents may occur in the airflow in one or more different portions of the duct system.

If an airflow sensor is placed in a location where an eddy current occurs, the velocity of the airflow measured by the airflow sensor may not be as high as expected for the duct system based on the airflow into the duct system. As a result, an airflow sensor may not provide as accurate of an indication of the velocity of the airflow as desired, for example, across a cross-section of the duct, depending on the location of the airflow sensor within the duct system.

As a result, the different systems controlling the airflow controller may not provide a desired level of airflow for functions, such as cooling, heating, removal of undesired gases, and other functions within the aircraft. Thus, equipment may operate at a higher temperature than desired, a passenger cabin may be warmer than desired, a flight deck may be cooler than desired, and/or other undesired effects may occur. Therefore, it would be desirable to have a method and apparatus that takes into account at least some of the issues discussed above, as well as other possible issues.

SUMMARY

In one illustrative embodiment, a velocity mapping system comprises a sensor system and an airflow mapper. The sensor system is configured to generate data about a velocity of airflow for a location in a duct system. The airflow mapper is configured to receive the data from the sensor system and generate a profile of the velocity of the airflow at the location in the duct system.

In another illustrative embodiment, a method for analyzing airflow in a duct system is present. Data is generated about a velocity of the airflow for a location in a duct system. A profile of the velocity of the airflow is generated at the location.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 9 is an illustration of an aircraft manufacturing and service method in accordance with an illustrative embodiment; and FIG. 10 is an illustration of an aircraft in which an illustrative embodiment may be implemented.

DETAILED DESCRIPTION

The illustrative embodiments recognize and take into account one or more different considerations. For example, the illustrative embodiments recognize and take into account that with the differences in the velocity of the airflow in a duct system, locations of sensors in the duct system may need to be relocated or the difference in airflow may need to be taken into account.

For example, a sensor may be moved from a location in which the velocity of the airflow is lower than the velocity of the airflow at the output of the duct system to a location where the velocity of the airflow is the same as the velocity of the airflow at the output of the duct. Alternatively, the difference between the velocity of the airflow at the output of the duct system and the velocity of the airflow measured by the sensor in the location may be identified. This difference may be taken into account in the data generated by the sensor for the velocity of the airflow for use in managing the airflow through the duct system. Variations in velocity of the airflow may also occur for cross sections in other locations in the duct system.

The illustrative embodiments also recognize and take into account that the airflow at the output of the duct system may have different velocities in different locations at the output. In other words, airflow moving through a plane at the output of the duct system may have different velocities at different locations in that plane. The uniformity of the velocity of the airflow through this plane may vary more as the configuration of the duct system becomes more complex.

Thus, the illustrative embodiments provide a method and apparatus for analyzing airflow in a duct system. In one illustrative embodiment, a velocity mapping system comprises a sensor system and an airflow mapper. The sensor system is configured to generate data about the velocity of the airflow for a location in a duct system. The airflow mapper is configured to receive the data from the sensor system and generate a profile of the velocity of the airflow at the location in the duct system.

Figure 1:
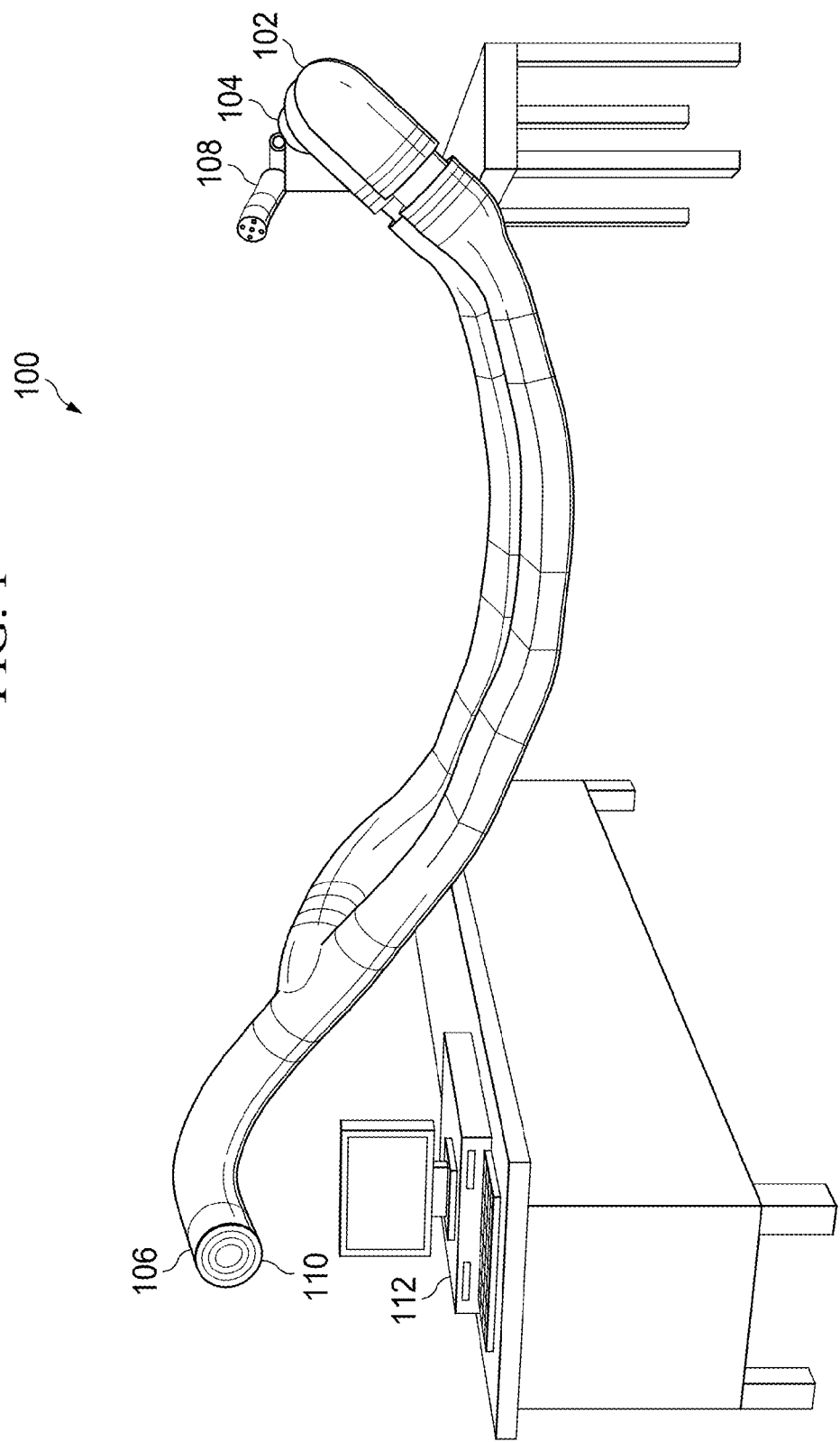
FIG. 1 is an illustration of a velocity mapping environment in accordance with an illustrative embodiment.

With reference now to the figures and, in particular, with reference to FIG. 1, an illustration of a velocity mapping environment is depicted in accordance with an illustrative embodiment. In this depicted example, velocity mapping environment 100 may be used to generate a velocity profile for duct system 102.

In this illustrative example, duct system 102 is an example of a duct system that may be used in a platform, such as an aircraft. Of course, duct system 102 may be used in other types of platforms in addition to or in place of an aircraft. For example, without limitation, duct system 102 may be used in a platform selected from one of a mobile platform, a stationary platform, a land-based structure, an aquatic-based structure, a space-based structure, or some other suitable platform. More specifically, duct system 102 may be used in a surface ship, a tank, a personnel carrier, a train, a spacecraft, a space station, a satellite, a submarine, an automobile, a power plant, a bridge, a dam, a manufacturing facility, and a building.

As depicted, duct system 102 is comprised of a plurality of ducts that are connected to each other. Duct system 102 has first end 104 and second end 106. First end 104 is the input end for airflow, and second end 106 is the output end for airflow in this illustrative example. As depicted, air source 108 is connected to first end 104 of duct system 102. In this example, air source 108 has a known flow rate.

In this illustrative example, sensor array 110 is physically connected to second end 106 of duct system 102. Sensor array 110 is configured to measure the velocity of the airflow at different locations at second end 106. Sensor array 110 measures the velocity of the airflow at second end 106, while air source 108 generates the airflow at first end 104.

Sensor array 110 is also in communication with computer 112. Sensor array 110 sends data generated from the measurements of the velocity of the airflow at second end 106. Computer 112 is configured to generate a profile for the velocity of the airflow as measured at second end 106. This profile may be used to identify the accuracy of a sensor within duct system 102.

Figure 2:
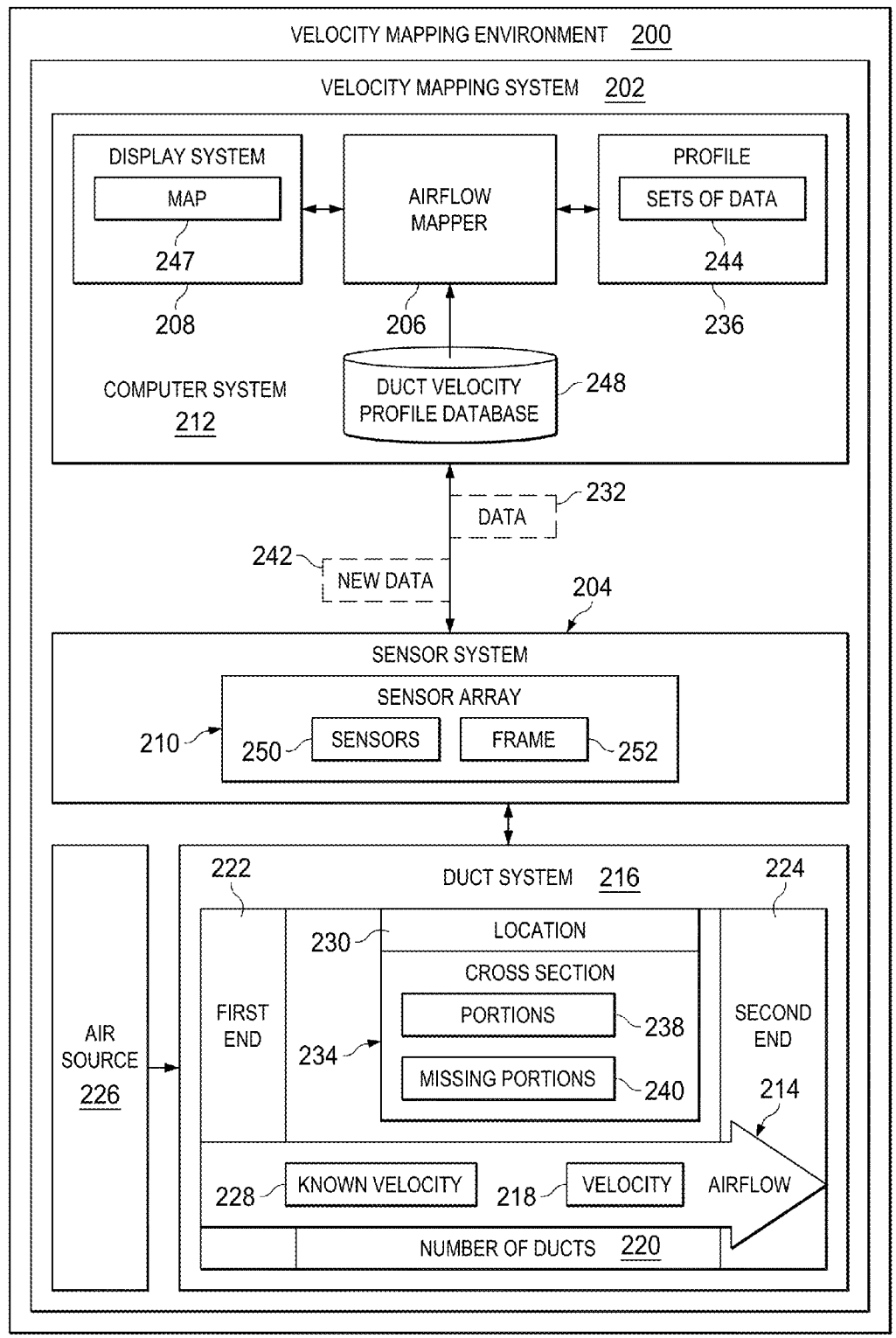
FIG. 2 is an illustration of a block diagram of a velocity mapping environment in accordance with an illustrative embodiment.

Turning now to FIG. 2, an illustration of a block diagram of a velocity mapping environment is depicted in accordance with an illustrative embodiment. In this illustrative example, velocity mapping environment 100 in FIG. 1 is an example of one implementation of velocity mapping environment 200 shown in block form in FIG. 2.

As depicted, velocity mapping environment 200 includes velocity mapping system 202. Velocity mapping system 202 comprises sensor system 204, airflow mapper 206, and display system 208.

Sensor system 204 is hardware, in this illustrative example, and takes the form of sensor array 210. Each sensor in sensor array 210 may measure the velocity of the airflow for a particular location. Sensor array 210 may be, for example, without limitation, a sensor array selected from at least one of pitot tubes, pressure gauges, anemometers, gas turbines, laser doppler flow meters, and other suitable types of sensors.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C.

As depicted, sensor array 210 comprises sensors 250 and frame 252. Sensors 250 are associated with frame 252. Frame 252 is a planar frame in this illustrative example. Frame 252 may be, for example, without limitation, concentric circles, a grid, or some other suitable form. Frame 252 is configured to be connected to a location in duct system 216. Frame 252 may have a shape that corresponds or conforms to the shape of duct system 216 in a location in which sensor array 210 is placed. In other words, frame 252 may have a shape that corresponds to a shape of a cross section in duct system 216. This shape may be, for example, circular, oval, or some other suitable shape, depending on the cross-sectional shape of the duct.

Sensors 250 are associated with frame 252 and may be arranged in different configurations. For example, sensors 250 may be arranged in a grid, concentric circles, or in some other arrangement on frame 252.

Airflow mapper 206 may take the form of hardware, software, or a combination of the two. When software is used, the operations performed by the components may be implemented in the program code configured to be run on a processor unit. When hardware is employed, the hardware may include circuits that operate to perform the operations in the components.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices.

In this illustrative example, airflow mapper 206 may be implemented in computer system 212. Computer system 212 is a number of computers. As used herein, a "number of", when used with reference to items, means one or more items. For example, a number of computers is one or more computers. When more than one computer is present in computer system 212, those computers may be in communication with each other over a communications media, such as a network.

Display system 208 is a hardware system and is comprised of a number of display devices. Display system 208 is connected to airflow mapper 206 and is part of computer system 212 in this illustrative example.

In this illustrative example, velocity mapping system 202 is used to analyze airflow 214 in duct system 216. In particular, velocity mapping system 202 may be used to map velocity 218 of airflow 214 in duct system 216.

In this illustrative example, duct system 216 is comprised of number of ducts 220. When more than one duct is present in number of ducts 220, these ducts may be connected to each other in different configurations such that duct system 216 has first end 222 and second end 224.

In mapping velocity 218 of airflow 214 of duct system 216, first end 222 of duct system 216 is connected to air source 226. Air source 226 generates airflow 214 at first end 222 with known velocity 228.

Sensor system 204 is placed in location 230 of duct system 216. Location 230 may be a number of different locations. For example, location 230 may be at the output of duct system 216 at second end 224. Location 230 also may be some location between first end 222 and second end 224. In some cases, location 230 may even be first end 222.

Sensor system 204 is configured to generate data 232 as sensor system 204 measures airflow 214 passing sensor system 204. In this illustrative example, sensor system 204 measures the various values for velocity 218 of airflow that may occur across cross section 234 of duct system 216. In other words, the velocity 218 may have different values at different locations on cross section 234. Cross section 234 may be a plane in duct system 216 through which airflow 214 passes.

Data 232 generated from these measurements by sensor system 204 is sent to airflow mapper 206. Airflow mapper 206 uses data 232 to generate profile 236 for duct system 216 at location 230.

In generating profile 236, data 232 may only be for portions 238 in cross section 234 of duct system 216. As a result, data 232 may be missing for other portions of cross section 234, and profile 236 may not be as complete as desired. In these illustrative examples, airflow mapper 206 is configured to generate data 232 for missing portions 240 in cross section 234.

In these illustrative examples, the measurements made by sensor system 204 occur continuously for a period of time. As time passes, velocity 218 of airflow 214 through cross section 234 may change within portions 238 as measured by sensor system 204. These changes in measurements result in the generation of new data 242 by sensor system 204. New data 242 is sent to airflow mapper 206.

Airflow mapper 206 updates profile 236. As a result, profile 236 may include sets of data 244 for different points in space and time. Thus, profile 236 comprises a number of sets of data 244 in which a set of data in the number of sets of data 244 represents velocity 218 of airflow 214 across cross section 234 of duct system 216 for a point in time.

In the illustrative examples, airflow mapper 206 may display profile 236 on display system 208. In these illustrative examples, the display of profile 236 on display system 208 may take the form of map 247. Map 247 may graphically indicate velocity 218 of airflow 214 for cross section 234 of duct system 216 in location 230. The display of velocity 218 for cross section 234 of duct system 216 in map 247 may change as velocity 218 changes in different sets of data in sets of data 244.

Further, profile 236 may be saved in duct velocity profile database 248. Duct velocity profile database 248 is a database of profiles of different duct systems. This database may be used to select duct systems when designing a platform. Duct velocity profile database 248 also may be used to make changes to designs for duct systems. For example, locations of sensors in a duct system may be selected using duct velocity profile database 248. Further, duct velocity profile database 248 also may be used to perform simulations of duct systems.

The illustration of velocity mapping environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, duct system 216 may have more than two ends in some illustrative examples. For example, duct system 216 may have two different outputs and one input. In this example, velocity 218 of airflow 214 may be measured for both of the outputs.

In another illustrative example, sensor system 204 may include one or more arrays of sensors in addition to sensor array 210. These additional arrays of sensors may be placed in other locations in addition to location 230 in duct system 216.

Figure 3:
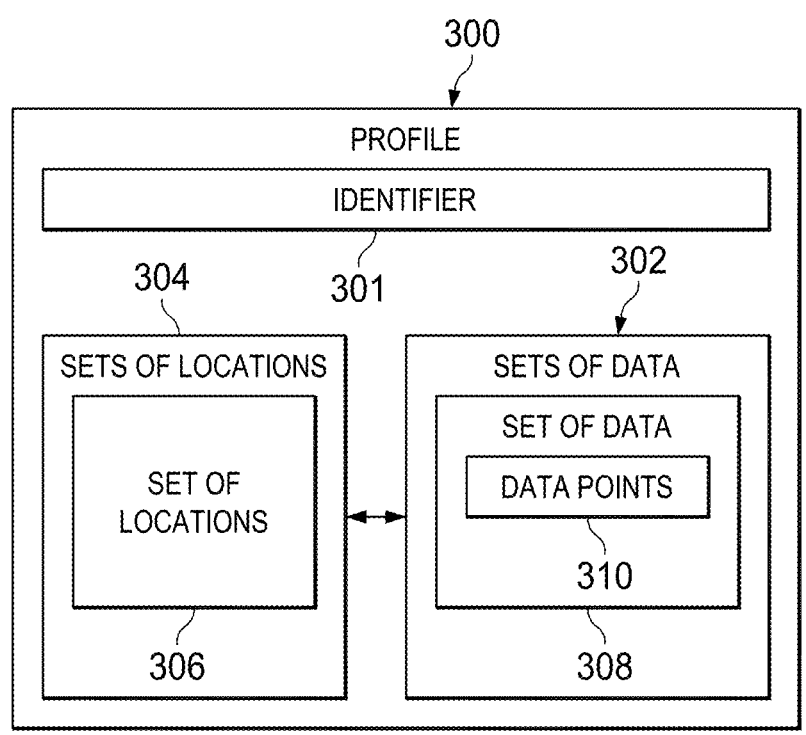
FIG. 3 is an illustration of a block diagram of a profile in accordance with an illustrative embodiment.

With reference next to FIG. 3, an illustration of a block diagram of a profile is depicted in accordance with an illustrative embodiment. Profile 300 is an example of one implementation for profile 236 in FIG. 2.

As depicted, profile 300 includes identifier 301, sets of data 302, and sets of locations 304. Identifier 301 identifies the duct system for which profile 300 was generated.

Sets of data 302 comprise data for the velocity of the airflow measured at a particular location in a duct system. Each set of data in sets of data 302 is data about the velocity of the airflow for a particular point in time. In other words, sets of data 302 represent the velocity of the airflow for a cross section for different periods of time.

Each set of locations in sets of locations 304 corresponds to a set of data in sets of data 302. For example, set of locations 306 in sets of locations 304 corresponds to set of data 308 in sets of data 302. As depicted, set of data 308 is comprised of data points 310. Data points 310 may be data generated by measurements of the velocity of the airflow or through interpolation of other data points in data points 310.

In these illustrative examples, each data point in data points 310 corresponds to a location in set of locations 306. In other words, each location in set of locations 306 identifies a location for a data point. In these illustrative examples, the locations are for a cross section in the duct system. This correspondence of locations to data points forms a map of the various velocities, for example, of the airflow across a cross section in a duct system.

In these illustrative examples, a data point in data points 310 is a percentage of a reference value. In this illustrative example, the reference value is the maximum air velocity. The maximum air velocity is the maximum air velocity as measured by the sensor array at a point in time.

For example, the sensors in the sensor array may be queried for a reading at the same time. The data for these readings are sent to airflow mapper 206 in FIG. 2. Airflow mapper 206 uses this data to identify the maximum air velocity. In these examples, the maximum air velocity is the highest velocity from the data received from the sensors in sensor array 210 in FIG. 2 for that reading.

Additionally, airflow mapper 206 may also generate all of the points in data points 310 from each velocity read by each sensor in sensor array 210 as a percentage of that maximum. This percentage is calculated for any interpolated data points in data points 310. When sensor array 210 is queried again for new data, a new maximum velocity is measured.

Although the maximum air velocity is used as the reference value, other values may be used. For example, other reference values may be, for example, without limitation, the desired velocity, known velocity 228 in FIG. 2, a value representing a design limit, and other suitable values. In other illustrative examples, the data point may be the velocity measured or interpolated for the location.

The illustration of profile 300 in FIG. 3 is not meant to limit the manner in which profiles may be generated by airflow mapper 206 in FIG. 2. For example, although more than one set of data is illustrated in profile 300, other profiles may only include one set of data.

Figure 4:
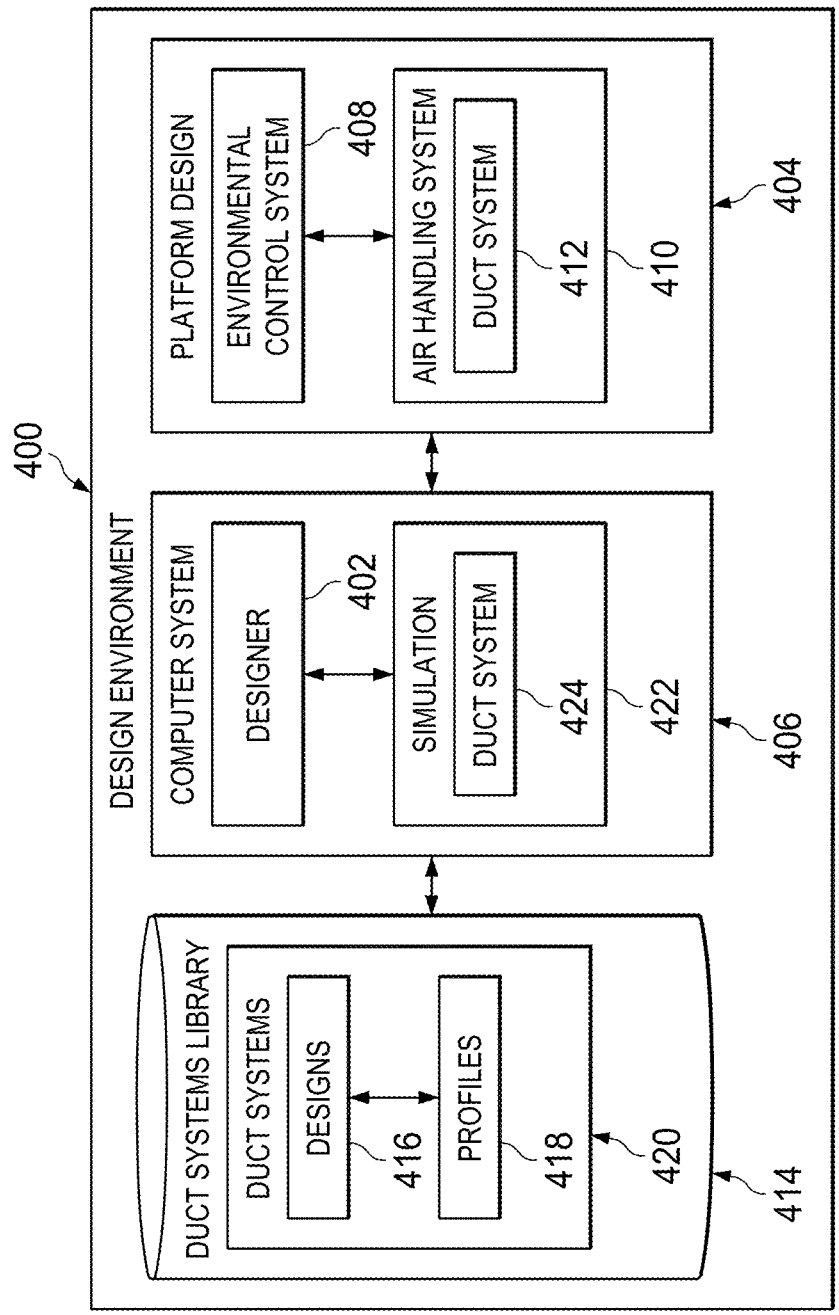
FIG. 4 is an illustration of a block diagram of a design environment in accordance with an illustrative embodiment.

Turning now to FIG. 4, an illustration of a block diagram of a design environment is depicted in accordance with an illustrative embodiment. In this illustrative example, design environment 400 includes designer 402. Designer 402 is configured to generate platform design 404. Platform design 404 may be, for example, without limitation, a design for an aircraft.

Designer 402 is implemented in hardware, software, or a combination of the two. Designer 402 is implemented in computer system 406 in this illustrative example. Computer system 406 is comprised of one or more computers.

As depicted, designer 402 may design environmental control system 408 for platform design 404. Designer 402 also may design air handling system 410. Air handling system 410 includes duct system 412.

In these illustrative examples, duct system 412 may be selected from duct systems library 414. Duct systems library 414 comprises designs 416 and profiles 418 for duct systems 420. In these illustrative examples, duct systems library 414 may be generated using information from duct velocity profile database 248 in FIG. 2. Profiles 418 are profiles for duct systems analyzed using velocity mapping system 202 in velocity mapping environment 200 in FIG. 2. Designs 416 are designs for the duct systems.

Further, designer 402 also may run simulation 422 for duct system 424 selected from duct systems 420 in duct systems library 414. This simulation may be performed to determine how duct system 424 will behave in platform design 404. The simulation may be performed using the design and profile associated with duct system 424 in duct systems library 414.

The illustration of design environment 400 is not meant to imply physical or architectural limitations to the manner in which an illustrative embodiment may be implemented. For example, without limitation, platform design 404 may be for an automobile, a building, a ship, or some other suitable platform in addition to or in place of an aircraft. Further, designer 402 also may be configured to combine duct systems within duct systems library 414 to form a new duct system. The simulation of the new duct system may be performed using the designs and profiles for the duct systems combined into the new duct system.

Figure 5:
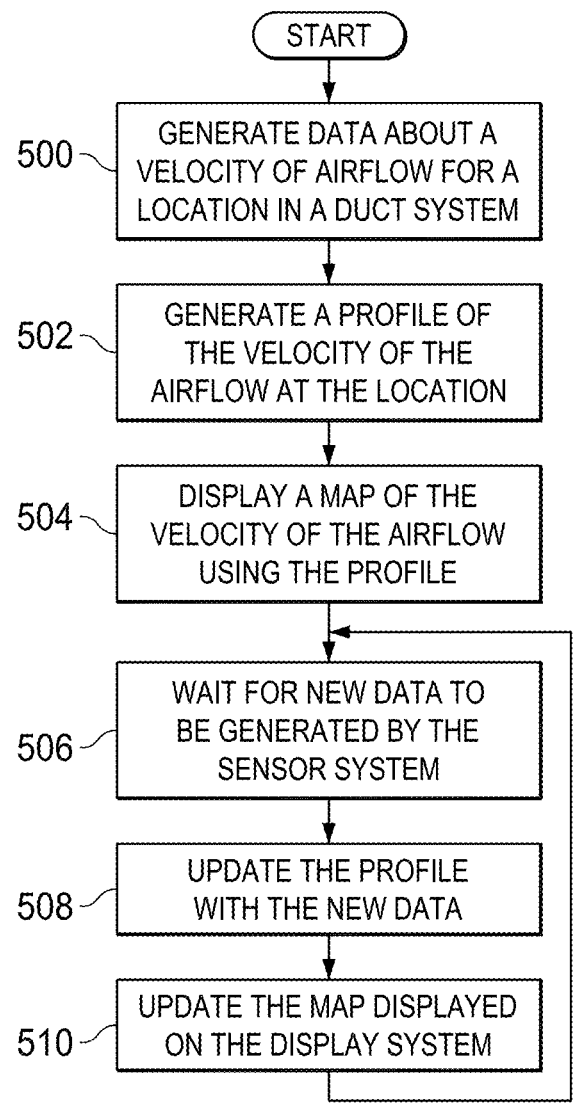
FIG. 5 is an illustration of a flowchart of a process for analyzing airflow in a duct system in accordance with an illustrative embodiment.

Turning now to FIG. 5, an illustration of a flowchart of a process for analyzing airflow in a duct system is depicted in accordance with an illustrative embodiment. The process illustrated in FIG. 5 may be implemented in velocity mapping environment 200 in FIG. 2. In particular, the process may be implemented using velocity mapping system 202.

The process begins by generating data about a velocity of airflow for a location in a duct system (operation 500). The duct system may be duct system 216 in FIG. 2. The data is generated by a sensor system, such as sensor system 204 in FIG. 2. A profile is generated of the velocity of the airflow at the location (operation 502). The profile includes sets of data for each point in time at which data is generated for the location in the duct system.

The process displays a map of the velocity of the airflow using the profile (operation 504). The map is displayed on a display system, such as display system 208 in FIG. 2. This map is a graphical indication of the set of data processed in operation 502.

The process waits for new data to be generated by the sensor system (operation 506). When new data is generated, the process updates the profile with the new data (operation 508). Thereafter, the process updates the map displayed on the display system (operation 510). The process then returns to operation 506 as described above. This process may continue until terminated.

The flowchart and block diagrams in the different depicted embodiments illustrate the architecture, functionality, and operation of some possible implementations of apparatuses and methods in an illustrative embodiment. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowchart or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 6:
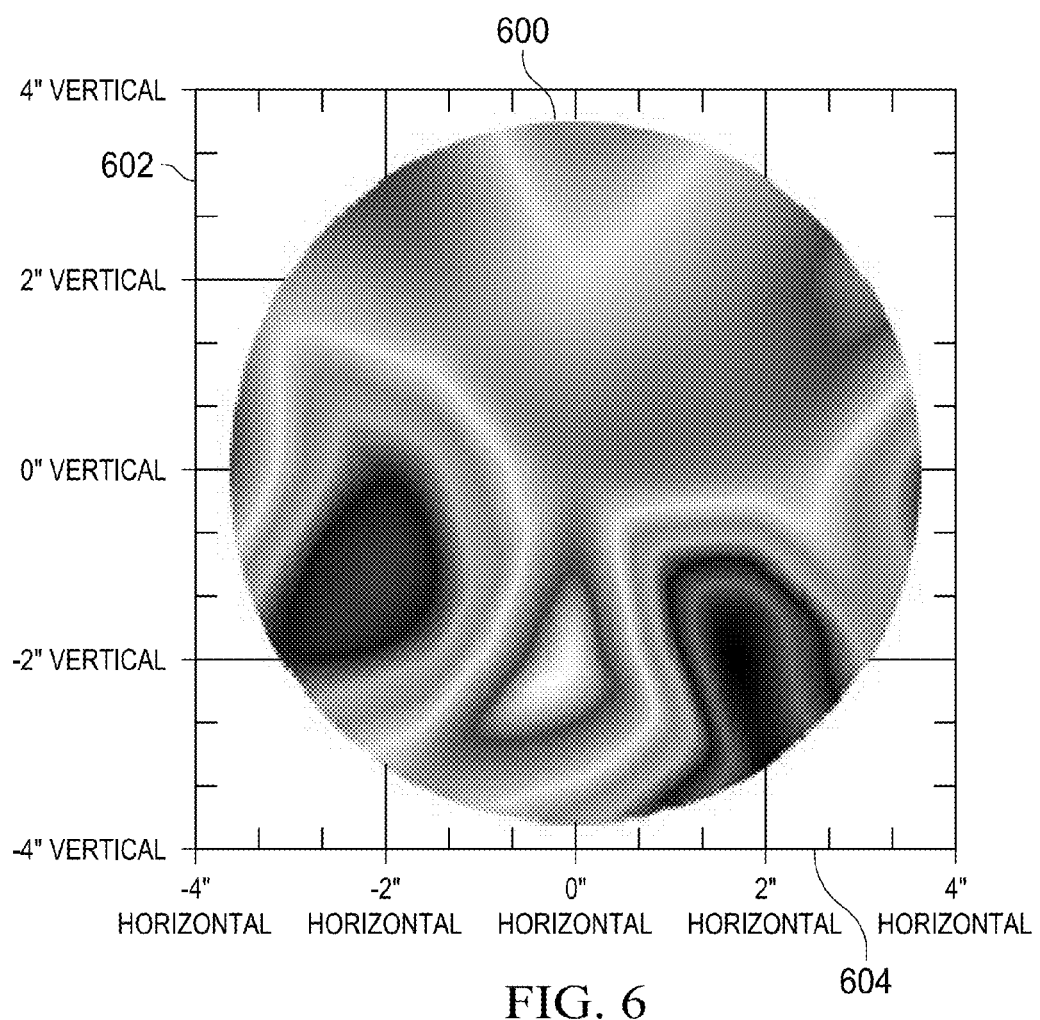
FIG. 6 is an illustration of a map in accordance with an illustrative embodiment.

Turning now to FIG. 6, an illustration of a map is depicted in accordance with an illustrative embodiment. Map 600 is an example of one implementation of map 247 displayed on display system 208 in FIG. 2.

In this illustrative example, map 600 indicates a velocity of the airflow for a cross section in a duct system. This cross section may be at the output, at the input, or at some other location in the duct system.

As depicted, map 600 is displayed with respect to vertical axis 602 and horizontal axis 604. In particular, the different data points in map 600 are displayed with respect to vertical axis 602 and horizontal axis 604 to identify the location of the data points in map 600.

In this illustrative example, the data points take the form of a percentage. The percentage is a percentage of the maximum velocity of the airflow exiting the duct system at a point in time. In these illustrative examples, the different values may be represented in a number of different ways. For example, different values for the data points may be represented using different colors, grayscale, and other suitable graphical identifiers.

Figure 7:
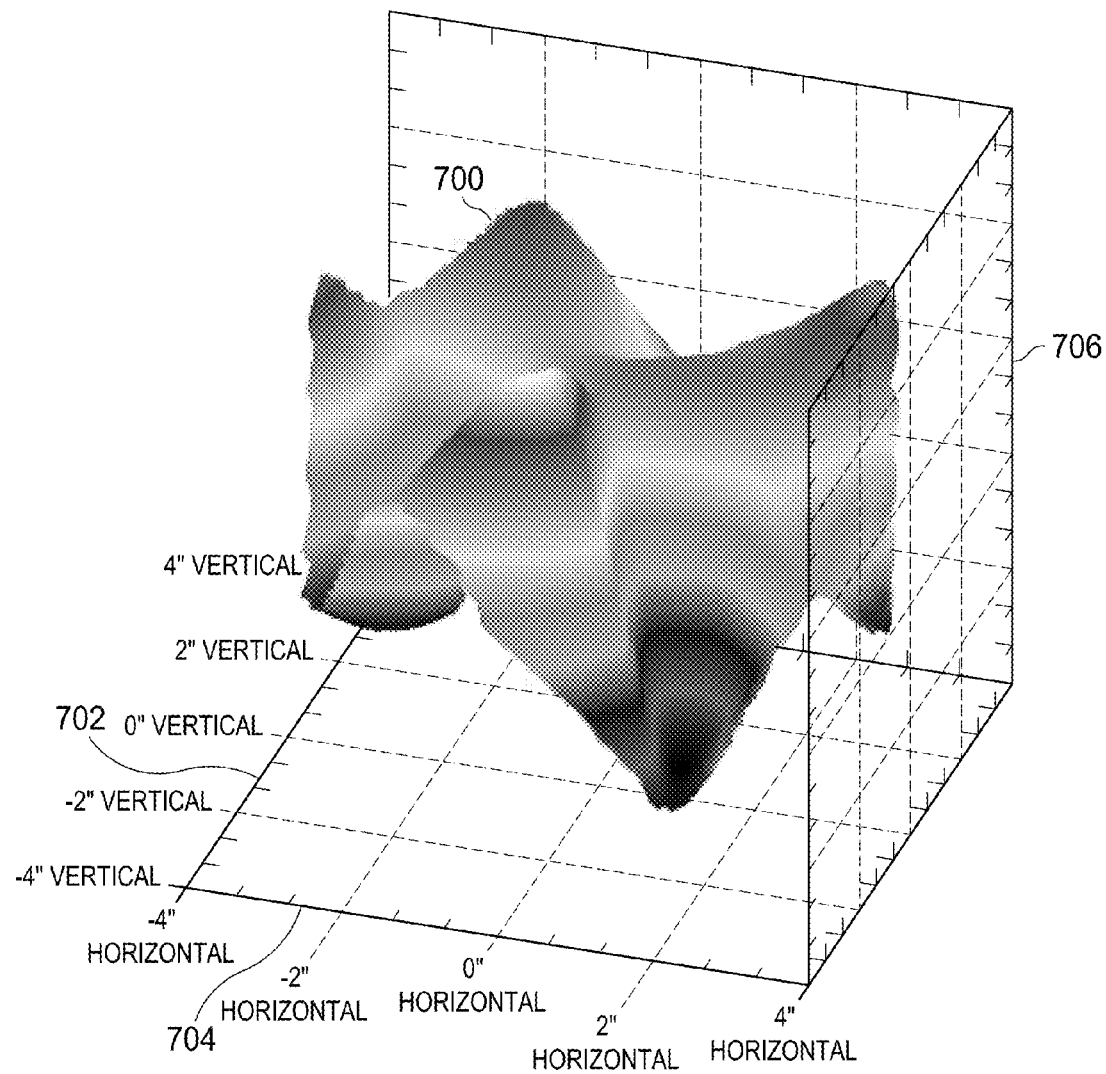
FIG. 7 is an illustration of a map in accordance with an illustrative embodiment.

With reference now to FIG. 7, an illustration of a map is depicted in accordance with an illustrative embodiment. Map 700 is another example of map 247 displayed on display system 208 in FIG. 2. In this illustrative example, map 700 takes the form of a three-dimensional map. Data points in map 700 are displayed with respect to vertical axis 702, horizontal axis 704, and value axis 706. Vertical axis 702 and horizontal axis 704 represent a location data in two-dimensional space. Some of the data points are from sensors, while other data points may be interpolated values. Value axis 706 represents the percentage of the velocity of airflow.

In this illustrative example, data points in map 700 are displayed with respect to vertical axis 702 and horizontal axis 704. As a result, the location of a data point indicates a location with respect to a cross section of the duct system. The data points are also displayed with respect to value axis 706. This axis provides an indication of the percentage for the data points.

The illustrations of map 600 in FIG. 6 and map 700 in FIG. 7 are not meant to limit the manner in which maps may be displayed. For example, the different axes may represent coordinates in a coordinate system with respect to a model of the duct system. In other illustrative examples, the display of these maps may be dynamic. For example, the maps may display multiple sets of data in a profile or may display data as new data is received from a sensor system.

Figure 8:
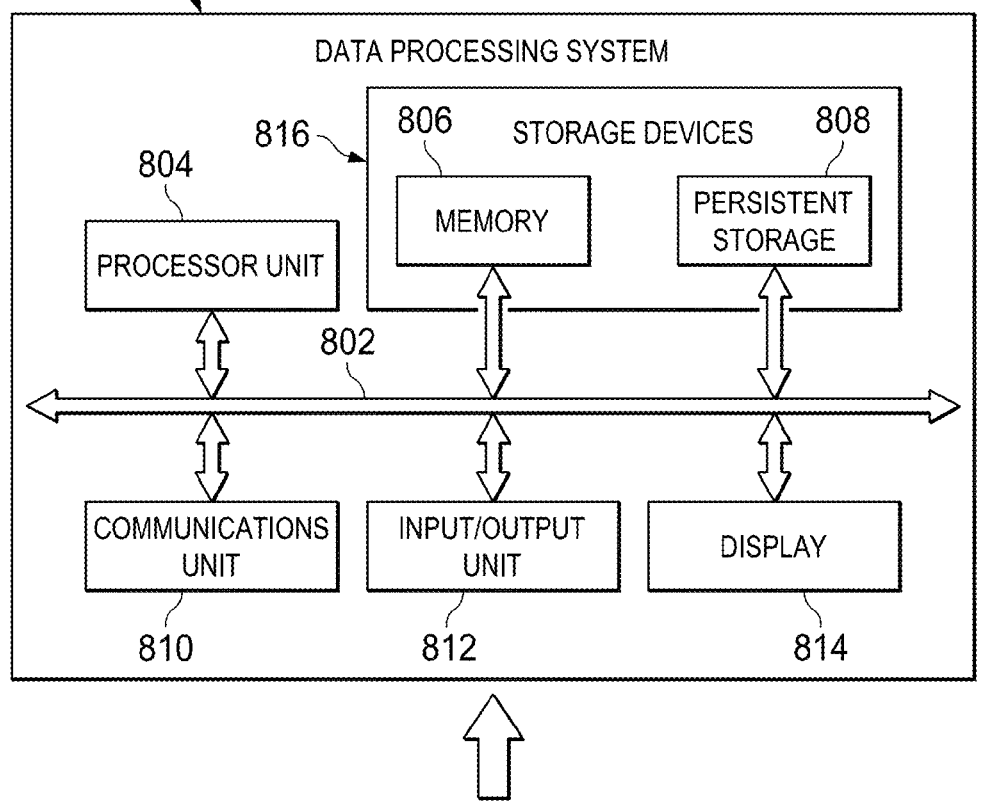
FIG. 8 is an illustration of a data processing system in accordance with an illustrative embodiment.

Turning now to FIG. 8, an illustration of a data processing system is depicted in accordance with an illustrative embodiment. Data processing system 800 may be used to implement computer 112 in FIG. 1, one or more computers in computer system 212 in FIG. 2, and one or more computers in computer system 406 in FIG. 4. In this illustrative example, data processing system 800 includes communications framework 802, which provides communications between processor unit 804, memory 806, persistent storage 808, communications unit 810, input/output (I/O) unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these illustrative examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user.

Instructions for the operating system, applications, and/or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these illustrative examples. In one example, computer readable media 820 may be computer readable storage media 824 or computer readable signal media 826.

In these illustrative examples, computer readable storage media 824 is a physical or tangible storage device used to store program code 818 rather than a medium that propagates or transmits program code 818.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 800 are not meant to provide architectural limitations to the manner in which different embodiments may be implemented. The different illustrative embodiments may be implemented in a data processing system including components in addition to and/or in place of those illustrated for data processing system 800. Other components shown in FIG. 8 can be varied from the illustrative examples shown. The different embodiments may be implemented using any hardware device or system capable of running program code 818.

Illustrative embodiments of the disclosure may be described in the context of aircraft manufacturing and service method 900 as shown in FIG. 9 and aircraft 1000 as shown in FIG. 10. Turning first to FIG. 9, an illustration of an aircraft manufacturing and service method is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 takes place. Thereafter, aircraft 1000 may go through certification and delivery 910 in order to be placed in service 912. While in service 912 by a customer, aircraft 1000 is scheduled for routine maintenance and service 914, which may include modification, reconfiguration, refurbishment, and other maintenance or service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft is depicted in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9. For example, velocity mapping system 202 in FIG. 2 may be used to generate profiles of duct systems, which may be used to select duct systems for aircraft 1000 during specification and design 902. As another illustrative example, profiles generated using velocity mapping system 202 also may be used in maintenance and service 914 to select duct systems during rework and upgrades of air distribution systems in aircraft 1000. The use of a number of the different illustrative embodiments may substantially expedite the assembly of and/or reduce the cost of aircraft 1000.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A velocity mapping system comprising:
   a sensor system configured to generate data about a velocity of airflow for a location in a duct system, wherein the sensor system comprises a sensor array having one or more sensors and a frame that has a shape that corresponds and conforms to a shape of a cross section of the duct system in the location where the sensor array is placed;
   an airflow mapper configured to receive the data from the sensor system and generate a profile of the velocity of the airflow at the location in the duct system; and
   an air source configured to be connected to an input end of the duct system and generate the airflow in the duct system;
   wherein the profile comprises a number of sets of data for different points in space and time, in which a set of data in the number of sets of data represents one or more velocities of airflow found across the cross section of the duct system for a point in time;
   wherein the data is for portions of the cross section of the duct system at the location and the airflow mapper is configured to interpolate the data for the portions of the cross section to generate data for missing portions of the cross section of the duct system;
   wherein the sensor system measures values for velocity of airflow across the cross section of the duct system;
   wherein the sensor system generates the data that is only for the portions in the cross section of the duct system;
   wherein the airflow mapper is configured to graphically indicate velocity of airflow for the cross section by displaying the profile on a display system in a form of a map;
   wherein the map graphically indicates the velocity of the airflow for the cross section of the duct system in the location;
   wherein display of the velocity for the cross section of the duct system in the map changes as the velocity changes in different sets of data in the sets of data, and
   wherein the profile comprising the number of sets of data representing the one or more velocities of the airflow found across the cross section of the duct system for different points in space and time is saved in a duct velocity profile database of profiles for different duct systems, whereby the profiles of duct systems generated by the velocity mapping system may be used in maintenance and service of an air distribution system in an aircraft.

2. The velocity mapping system of claim 1, wherein the airflow mapper is configured to update the profile as the data about the velocity of the airflow changes.

3. The velocity mapping system of claim 2, wherein each update of the profile forms a new set of data in the number of sets of data in the profile.

4. The velocity mapping system of claim 1, wherein the profile comprises data points in which a data point in the data points is a percentage of a maximum air velocity.

5. The velocity mapping system of claim 1, wherein the airflow generated by the air source has a known flow rate.

6. The velocity mapping system of claim 1, wherein the airflow mapper comprises:
   a processor unit;
   a storage device; and
   program code stored on the storage device, wherein the processor unit is configured to run the program code to receive the data from the sensor system and generate the profile of the velocity of the airflow at the location in the duct system.

7. A method for analyzing airflow in a duct system, the method comprising:
   generating, via a sensor system, data about a velocity of the airflow for a location in the duct system, wherein the sensor system comprises a sensor array having one or more sensors and a frame that has a shape that corresponds and conforms to a shape of a cross section of the duct system in the location where the sensor array is placed; and generating a profile of the velocity of the airflow at the location;

wherein an air source connected to an input end of the duct system generates the airflow in the duct system;

wherein the profile comprises a number of sets of data for different points in space and time, in which a set of data in the number of sets of data represents one or more velocities of airflow found across the cross section of the duct system for a point in time;

wherein the data is for portions of the cross section of the duct system at the location and an airflow mapper is configured to interpolate the data of the portions of the cross section to generate data for missing portions of the cross section of the duct system;

wherein the sensor system measures values for velocity of airflow across the cross section of the duct system;

wherein the sensor system generates the data that is only for the portions in the cross section of the duct system;

wherein the airflow mapper is configured to graphically indicate velocity of airflow for the cross section by displaying the profile on a display system in a form of a map;

wherein the map graphically indicates the velocity of the airflow for the cross section of the duct system in the location;

wherein display of the velocity for the cross section of the duct system in the map changes as the velocity changes in different sets of data in the sets of data; and wherein the profile comprising the number of sets of data representing the one or more velocities of the airflow found across the cross section of the duct system for different points in space and time is saved in a duct velocity profile database of profiles for different duct systems, whereby the profiles of duct systems generated by the velocity mapping system may be used in maintenance and service of an air distribution system in an aircraft.

8. The method of claim 7 further comprising:
updating the profile as the data about the velocity of the airflow changes.

9. The method of claim 8, wherein an update to the profile forms a new set of data in the number of sets of data in the profile.

10. The method of claim 7, wherein the profile comprises data points in which a data point in the data points is a percentage of a maximum air velocity.

11. The method of claim 7 further comprising:
storing the profile in a library of profiles for a plurality of duct systems.

12. The velocity mapping system of claim 1,
wherein the duct system is comprised of a plurality of ducts that are connected to each other;
wherein the duct system has a first end and a second end;
wherein the first end is the input end for the airflow, and the second end is the output end for the airflow;
wherein the sensor array is physically connected to the second end of the duct system;
wherein the sensor array is configured to measure the velocity of the airflow at different locations at the second end of the duct system;
wherein the sensor array measures the velocity of the airflow at the second end while the air source generates the airflow at the first end;
wherein the sensor array is in communication with a computer system of the airflow mapper;
wherein the sensor array sends data generated from measurements of the velocity of the airflow at the second end of the duct system;
wherein the profile is used to identify an accuracy of a sensor of the sensor array within the duct system;
wherein each sensor in the sensor array measures a velocity of the airflow for a particular location of the cross section of the duct system in the location where the sensor array is placed;
wherein the sensor array comprises one or more of a pitot tube and a gas turbine;
wherein the frame is a planar frame that comprises one of concentric circles and a grid;
wherein the frame is configured to be connected to the location in the duct system;
wherein the shape of the frame depends on a cross-sectional shape of the duct system in the location in the duct system; and
wherein the sensors are associated with the frame and are arranged in one of a grid and concentric circles.

13. The method of claim 7 further comprising:
identifying a location in the cross section of the duct system having a desired velocity of airflow; and
placing a sensor at the identified location.

14. A velocity mapping system comprising:
a sensor system configured to generate data about a velocity of airflow for a location in a duct system, wherein the sensor system comprises a sensor array having one or more sensors and a frame connected to an output of the duct system, wherein the one or more sensors generate the data about the velocity of the airflow, wherein the one or more sensors comprise one or more of a pitot tube or a gas turbine, and wherein the frame has a shape that corresponds and conforms to a shape of a cross section of the duct system in the location where the sensor array is placed;
an airflow mapper configured to receive the data from the sensor system and generate a profile of the velocity of the airflow at the location in the duct system; and
an air source configured to be connected to an input end of the duct system and generate the airflow in the duct system;
wherein the profile comprises a number of sets of data in which a set of data in the number of sets of data represents one or more velocities of airflow found across the cross section of the duct system for a point in time;
wherein the data is for portions of the cross section of the duct system at the location and the airflow mapper is configured to interpolate the data for the portions of the cross section to generate data for missing portions of the cross section of the duct system;
wherein the sensor system measures values for velocity of airflow across the cross section of the duct system;
wherein the sensor system generates the data that is only for the portions in the cross section of the duct system;
wherein the airflow mapper is configured to graphically indicate velocity of airflow for the cross section by displaying the profile on a display system in a form of a map;
wherein the map graphically indicates the velocity of the airflow for the cross section of the duct system in the location;

wherein display of the velocity for the cross section of the duct system in the map changes as the velocity changes in different sets of data in the sets of data; and wherein the profile comprising the number of sets of data representing the one or more velocities of the airflow found across the cross section of the duct system for different points in space and time is saved in a duct velocity profile database of profiles for different duct systems, whereby the profiles of duct systems generated by the velocity mapping system may be used in maintenance and service of an air distribution system in an aircraft.

15. The velocity mapping system of claim 14, wherein the duct system comprises a plurality of ducts connected to one another at the input end and at the output end.

* * * * *